United States Patent
Wicker

[11] 3,928,277
[45] Dec. 23, 1975

[54] MOULDING COMPOSITIONS

[76] Inventor: George L. Wicker, 1 Lowhouse Close, Milnrow, Lancashire, England

[22] Filed: Aug. 2, 1974

[21] Appl. No.: 494,252

Related U.S. Application Data

[63] Continuation-in-part of Ser. No. 260,153, June 6, 1972, abandoned.

[52] U.S. Cl. ........ 260/37 N; 106/15 FP; 260/42.44; 260/42.45; 260/45.7 R; 260/45.75 B
[51] Int. Cl.² .... C08K 3/22; C08K 5/03; C08K 7/12
[58] Field of Search ............. 260/42.44, 42.45, 37 N

[56] References Cited
UNITED STATES PATENTS

| | | | |
|---|---|---|---|
| 3,090,764 | 5/1963 | Ellis et al. | 260/42.45 |
| 3,331,797 | 7/1967 | Kopetz et al. | 260/28.5 |
| 3,576,784 | 4/1971 | Gloor | 260/42.45 |
| 3,640,929 | 2/1972 | Darling | 260/23 H |
| 3,654,202 | 4/1972 | Eusebi | 260/23 H |

*Primary Examiner*—James H. Derrington
*Attorney, Agent, or Firm*—Lawrence Rosen; E. Janet Berry

[57] ABSTRACT

Fire resistant compositions comprising a thermoplastic polymer, chrysotile asbestos, and an additive mixture of an antimony compound and a halogenated hydrocarbon.

3 Claims, No Drawings

MOULDING COMPOSITIONS

This application is a continuation-in-part of Ser. No. 260,153 filed June 6th, 1972, now abandoned.

Thermoplastic polymeric materials are increasingly used in place of metals for the manufacture of various articles and parts but they suffer from lack of resistance to ignition. In particular, polyolefins, especially polypropylene and copolymers of propylene, are notoriously poor in resisting ignition and spread of fire. This is the more unfortunate as polypropylene and copolymers of propylene, because of their resistance to deformation at elevated temperatures, are used for automobile heater ducts and other under-bonnet and interior parts and for such uses resistance to ignition and spread of fire are obviously important requirements. This requirement for resistance to ignition is also met in other fields in which thermoplastic polymeric materials are used and with other materials such as polystyrene and polyamides.

It is well known that the improved resistance to ignition and burning of thermoplastic polymeric materials can be produced by the incorporation of various additives, of which the most commonly used are halogenated hydrocarbons and antimony trioxide, but which include phosphorus and boron compounds. Combinations of antimony trioxide and halogenated hydrocarbons can act synergistically in suppressing the burning of polymeric materials and so are particularly useful.

The proportions of any such additives required to suppress the burning of polyolefins and other polymers are however, so high as to result in a considerable, and in some cases unacceptable, reduction in the resistance of deflection at elevated temperatures and in a worsening of mechanical properties such as tensile strength, flexural strength and impact strength. The additives are expensive and the high proportions required often make the price of the final products uncompetitive. In addition, the additives reduce the resistance to weathering and can be leached out by weathering or solvents, thus resulting in a lowering of the resistance to ignition.

To reinforce polymeric materials by glass fibres is well known and if glass fibres are incorporated in polymeric materials rendered fire resistance by additives such as those described above, the mechanical properties and resistance to deflection at elevated temperatures are usefully improved but the cost of the materials is increased even further.

It is also known to reinforce polymeric materials with asbestos fibres, and it has been claimed that improved physical properties can be obtained by chemically treating the surface of chrysotile asbestos fibres whereby the treated fibres may be incorporated into synthetic resins and chemically combined therewith.

I have made the suprising discovery that if chrysotile asbestos is incorporated, in selective proportions with fire retardent additives, into thermoplastic polymeric materials, commercially acceptable fire retardant ratings and mechanical properties are achieved, using much less of the fire retardant additives than is necessary to obtain acceptable suppression of burning of the polyolefins and other polymers as referred to above.

I believe that this effect is due to the chrysotile asbestos fibre exhibiting, at least in the compositions of this invention, a fire retardant additive property not hitherto recognised; this property is additional to (and not equivalent to, nor a result of) the very well known property of flame resistance.

According to the present invention, I provide fire resistant thermoplastic compositions comprisng
a. at least 40 percent, and generally about 40 to 90 percent, thermoplastic polymer such as polypropylene, copolymers of propylene, polyethylene, polystyrene, styrene/acrylonitrile copolymers, polyamides, and mixture thereof;
b. from 5 to 40 percent, and preferably from 20 to 40 percent, by weight of chrysotile asbestos fibres; and
c. from 2.5 to 20 percent by weight of a fire retardant additive selected from the group consisting of halogenated hydrocarbons and mixtures of a halogenated hydrocarbon with a fire retardant inorganic compound.

The inclusion of the chrysotile asbestos fibres provides the suprising result that the proportion of fire retardant additive required to give a particular level of fire resistance can be reduced considerably below the proportion which would be expected to be necessary on the basis of the effects of including chrysotile asbestos fibre and a fire retardant additive separately into thermoplastic polymers. This discovery is surprising since the fire resistance of thermoplastic polymers is generally not greatly affected by the inclusion of chrysotile asbestos fibres in the absence of a fire retardant additive and, in the case of certain thermoplastic polymers giving rise to relatively low viscosity melts e.g. polyamides such as nylon 6, the inclusions of chrysotile asbestos fibres alone in proportions up to about 10 percent by weight appreciably worsens the fire resistance of the polymers.

The fact that chrysotile asbestos apparently acts as a fire retardant additive is most advantageous since the asbestos fibres are exceedingly cheap in comparison to fire retardant additives which are, as already mentioned, expensive. Thus, even if the amount of the chrysotile asbestos fibres used in order to achieve a given fire resistance is considerably greater than the reduction in the amount of fire retardant additive necessary, the final products are still cheaper.

The chrysotile asbestos fibres are also of great value in that, unlike fire retardant additives, they improve the mechanical properties of the materials. Thus, the inclusion of the chrysotile asbestos fibres at least offsets any disadvantageous effect on the mechanical properties caused by the fire retardant additives and, depending on the proportion of the fibres, the mechanical properties of the compositions may be considerably better than those of the thermoplastic polymers themselves. As already mentioned, glass fibres can be used to reinforce polymeric materials thereby improving their mechanical properties and resistance to deflection at elevated temperatures but glass fibres only have a slight cooperative effect on fire resistance when used with fire retardant additives compared with the considerable beneficial cooperative effect produced by use of chrysotile asbestos fibres with a fire retardant additive in a thermoplastic polymer. This distinction is quite unexpected since glass fibres, like chrysotile asbestos fibres, when used alone in thermoplastic polymers generally have little effect on fire resistance and, again like the asbestos fibres, tend to worsen fire resistance in the case of some thermoplastic polymers e.g. ones giving rise to relatively low viscosity melts.

What makes the apparent fire-retardant property of chrysotile asbestos even more surprising is that other forms of asbestos such as anthophyllite and amosite do not exhibit the same beneficial effect if substituted for chrysolite asbestos in the compositions of this invention.

By enabling a given fire resistance to be obtained by use of smaller proportions of fire retardant additive the use of chrysotile asbestos fibres is beneficial in that the flow properties of the compositions under moulding conditions are less affected by the additives and the adverse effect on fire resistance of weathering and solvent leaching of the additive is reduced.

An additional advantage of the compositions of this invention is that, for a given fire resistance rating, the density of the smoke generated in the case of fire is reduced, and hence a reduction in toxicity is achieved.

The compostions according to the invention as initially manufactured will usually be in the form of particulate moulding compositions. Such composition can be made by known methods such as extrusion compounding a melt of the polymer with the asbestos fibres and the additive and granulating or pelleting the extrudate. The moulding compositions may be used in the manufacture of moulded or extruded articles.

The proportions of the components in the compositions according to the invention can vary widely within the above ranges depending on the particular mechanical and fire retardant properties desired and on the nature of the components. For a composition comprising given components the amount of fire retardant additive required to achieve a given fire resistance will naturally depend, within limits, on the amount of the chrysotile asbestos fibres. As it will often be desirable, for the sake of mechanical properties, to include quite substantial proportions of asbestos fibres, eg. 20 percent by weight or more, the amount of additive required to give a desired fire resistance will often be quite small e.g. 5 to 10 percent by weight because of the co-operative effect of the chrysotile asbestos fibres.

One or fire retardant additives may be present in the compositions and it is preferred to use mixtures of antimony trioxide with halogenated hydrocarbons. Mixtures of antimony trioxide and decabromodiphenyl are particularly preferred, the most preferred mixture being one containing 3 parts by weight of decabromodiphenyl per part by weight of antimony trioxide. Halogenated hydrocarbons may be used alone or in admixture with fire retardant additives other than antimony trioxide. Also, useful fire retardant additives include boron and phosphorus compounds and any of these may be used singly or in admixture with one or more other fire retardant additive.

The compositions according to the invention may contain more than one thermoplastic polymer. Also the compositions may contain conventional additives suchs as stabilisers for the polymer, fillers and pigments in addition to the fire retardant additive and asbestos fibres.

A method of testing the rate of burning of plastics is described in method 508A of BS 2782 (1970). In it, a bar of the material 13 mm wide × 150 mm long × 1.5 − 3.0 mm thick is used and two lines are scribed on one face of the bar. The first line is at 25 mm in from one end and the second line is at 127 mm from the same end. The igniting flame is applied to that end. The bar is clamped so that its length is horizontal and its width is tilted at 45° to the horizontal and the flame is applied for 10 seconds.

In the above test method, if, after application of the flame, the material does not burn to the first mark and does not flame for more than 5 seconds after removal of the flame, the material is classed as "self extinguishing." If the material burns beyond the first mark, but the flame does not reach the second mark, the material is classed as "Resistant to flame propagation." If the materials burn beyond the second mark, the rate of burning in mm per minute is recorded.

Compositions according to the invention are self-extinguishing or resistant to flame propagation under the conditions of the above test.

The following examples illustrate the invention. In the examples the test method described above was used. In the tests it was also observed whether or not burning fragments dripped from the test material and what happened to the fragments and remaining test portion if such fragments did drip. As far as the spread of fire is concerned the dripping of burning fragments is a particular hazard. The examples show that not only are the chrysotile asbestos fibres greatly superior to glass fibres and to anthophyllite or amosite asbestos as far as burning of the test specimens themselves is concerned but that the chrysotile asbestos fibres are also of greater utility in preventing the dripping of burning fragments.

EXAMPLE 1

Compounds a – p, and A to S the formulations of which are shown in Tables 1 and 2 respectively were made by extrusion compounding and granulating the extrudate. 150 mm × 13 mm × 3.0 mm test specimens were made from the granulate in each case by injection moulding and tested according to method 508A of BS 2782. The results are shown in the Tables.

The level of fire retardant additive in each composition is calculable by adding together the individual contents of the additives.

In the Tables, the numerical superscripts designate the following:

1. 0.25 inch chopped glass fibre
2. Decabromodiphenyl
3. "DECHLORANE" is a trademark designating a material which is the double Diels-Adler reaction product of hexachlorocyclopentadiene and cyclooctadiene.
4. Rating according to BS 2782 method 508A: SE= self extinguishing, RTFP = resistant to flame propagation.
5. "Burns" = Burning rate in mm/minute by above BS Test.
6. Drips: B = Bends; SB = Severe bending. * = extinguishes by burning drips falling away.

TABLE 1

| Composition | Propylene Homopolymer | Glass[1] Fibre | Chrysotile | Anthophyllite | Amosite | DCB[2] | DECHLORANE[3] | $Sb_2O_3$ | Rating[4] | Burns[5] | Drips[6] |
|---|---|---|---|---|---|---|---|---|---|---|---|
| a | 95 | — | — | — | — | 3.75 | — | 1.25 | Burns | 18 | Yes |
| b | 90 | — | — | — | — | 7.50 | — | 2.50 | Burns | 24 | Yes |
| c | 85 | — | — | — | — | 11.25 | — | 3.75 | Burns | 11 | Yes |
| d | 80 | — | — | — | — | 15.0 | — | 5.0 | RTFP | 11 | Yes* |

TABLE 1-continued

| Composition | Propylene Homopolymer | Glass[1] Fibre | Chrysotile | Anthophyllite | Amosite | DCB[2] | DE-CHLORANE[3] | $Sb_2O_3$ | Rating[4] | Burns[5] | Drips[6] |
|---|---|---|---|---|---|---|---|---|---|---|---|
| e | 71.3 | 23.7 | — | — | — | 3.75 | — | 1.25 | Burns | 25 | Yes* |
| f | 67.5 | 22.5 | — | — | — | 7.50 | — | 2.50 | RTFP | 20 | Yes* |
| g | 63.8 | 21.2 | — | — | — | 11.25 | — | 3.75 | RTFP | 2 | No |
| h | 71.3 | — | 23.7 | — | — | 3.75 | — | 1.25 | RTFP | 15 | No |
| i | 67.5 | — | 22.5 | — | — | 7.50 | — | 2.50 | SE | — | No |
| j | 63.8 | — | 21.2 | — | — | 11.25 | — | 3.75 | SE | — | No |
| k | 71.3 | — | — | 23.7 | — | 3.75 | — | 1.25 | Burns | 30 | Yes |
| l | 67.5 | — | — | 22.5 | — | 7.50 | — | 2.50 | Burns | 28 | Yes |
| m | 63.8 | — | — | 21.2 | — | 11.25 | — | 3.75 | Burns | 25 | Yes |
| n | 71.3 | — | — | — | 23.7 | 3.75 | — | 1.25 | Burns | 26 | Yes |
| o | 67.5 | — | — | — | 22.5 | 7.50 | — | 2.50 | Burns | 25 | Yes |
| p | 63.8 | — | — | — | 21.2 | 11.25 | — | 3.75 | RTFP | + | Yes |

+—extinction time 120 seconds

TABLE 2

| Composition | Propylene Homopolymer | Glass Fibre | Chrysotile | Anthophyllite | Amosite | DCB[2] | DE-CHLORANE[3] | $Sb_2O_3$ | Rating[4] | Burns[5] | Drips[6] |
|---|---|---|---|---|---|---|---|---|---|---|---|
| A | 95 | — | — | — | — | — | 3.75 | 1.25 | Burns | 32 | Yes |
| B | 90 | — | — | — | — | — | 7.50 | 2.50 | RTFP | 30 | Yes* |
| C | 85 | — | — | — | — | — | 11.25 | 3.75 | RTFP | 27 | Yes* |
| D | 80 | — | — | — | — | — | 15.00 | 5.0 | RTFP | 26 | Yes* |
| E | 55 | 40 | — | — | — | — | 3.75 | 1.25 | Burns | 24 | Yes |
| F | 50 | 40 | — | — | — | — | 7.50 | 2.50 | Burns | 16 | Yes |
| G | 45 | 40 | — | — | — | — | 11.25 | 3.75 | RTFP | 11 | Yes |
| H | 55 | — | 40 | — | — | — | 3.75 | 1.25 | Burns | 10 | No |
| I | 50 | — | 40 | — | — | — | 7.50 | 2.50 | RTFP | 7 | No |
| J | 45 | — | 40 | — | — | — | 11.25 | 3.75 | SE | — | No |
| K | 55 | — | — | 40 | — | — | 3.75 | 1.25 | Burns | 16 | Yes |
| L | 50 | — | — | 40 | — | — | 7.50 | 2.50 | Burns | 14 | Yes |
| M | 45 | — | — | 40 | — | — | 11.25 | 3.75 | RTFP | 9 | SB |
| N | 55 | — | — | — | 40 | — | 3.75 | 1.25 | Burns | 15 | SB |
| O | 50 | — | — | — | 40 | — | 7.50 | 2.50 | Burns | 11 | SB |
| P | 45 | — | — | — | 40 | — | 11.25 | 3.75 | RTFP | 8 | B |
| Q | 55 | — | 40 | — | — | 3.75 | — | 1.25 | RTFP | 6 | No |
| R | 50 | — | 40 | — | — | 7.50 | — | 2.50 | SE | — | No |
| S | 45 | — | 40 | — | — | 11.25 | — | 3.75 | SE | — | No |

TABLE 3

| Composition | High Density Polyethylene% | Glass[1] Fibre | Chrysotile | DCB[2] | $Sb_2O_3$ | Rating[4] | Burns[5] | Drips[6] |
|---|---|---|---|---|---|---|---|---|
| a | 95.0 | 0 | 0 | 3.75 | 1.25 | Burns | 20 | Yes |
| b | 90.0 | 0 | 0 | 7.50 | 2.50 | RTFP | 10 | Yes* |
| c | 85.0 | 0 | 0 | 11.25 | 3.75 | SE | — | Yes, drips extinguish |
| d | 82.0 | 0 | 0 | 13.50 | 4.50 | SE | — | Yes, drips extinguish |
| e | 71.3 | 23.7 | 0 | 3.75 | 1.25 | Burns | 15 | Yes |
| f | 67.5 | 22.5 | 0 | 7.50 | 2.50 | RTFP | negligible | No |
| g | 63.8 | 21.2 | 0 | 11.25 | 3.75 | SE | — | No |
| h | 71.3 | 0 | 23.7 | 3.75 | 1.25 | SE | — | No |
| i | 67.5 | 0 | 22.5 | 7.50 | 2.50 | SE | — | No |
| j | 63.8 | 0 | 21.2 | 11.25 | 3.75 | SE | — | No |

TABLE 4

| Composition | Polystyrene% | Glass[1] Fibre | Chrysotile | DCB[2] | $Sb_2O_3$ | Rating[4] | Burns[5] | Drips[6] |
|---|---|---|---|---|---|---|---|---|
| a | 95.0 | 0 | 0 | 3.75 | 1.25 | Burns | 30 | Yes |
| b | 90.0 | 0 | 0 | 7.50 | 2.50 | Burns | 25 | Yes |
| c | 85.0 | 0 | 0 | 11.25 | 3.75 | RTFP | 20 | Yes* |
| d | 75.0 | 0 | 0 | 18.75 | 6.25 | SE | — | Yes, drips extinguish |
| e | 71.3 | 23.7 | 0 | 3.75 | 1.25 | Burns | 20 | Yes |
| f | 67.5 | 22.5 | 0 | 7.50 | 2.50 | RTFP | 10 | Yes* |
| g | 63.8 | 21.2 | 0 | 11.25 | 3.75 | SE | — | Yes, drips extinguish |
| h | 71.3 | 0 | 23.7 | 3.75 | 1.25 | RTFP | 10 | No |
| i | 67.5 | 0 | 22.5 | 7.50 | 2.50 | SE | — | No |
| j | 63.8 | 0 | 21.2 | 11.25 | 3.75 | SE | — | No |

TABLE 5

| Composition | Styrene/Acrylonitrile % | Glass[1] Fibre | Chrysotile | Anthophyllite | Amosite | DCB[2] | $Sb_2O_3$ | Rating[4] | Burns[5] | Drips[6] |
|---|---|---|---|---|---|---|---|---|---|---|
| a | 95.0 | 0 | 0 | 0 | 0 | 3.75 | 1.25 | Burns | 25 | Yes |
| b | 90.0 | 0 | 0 | 0 | 0 | 7.50 | 2.50 | RTFP | 15 | Yes |
| c | 85.0 | 0 | 0 | 0 | 0 | 11.25 | 3.75 | SE | — | Yes, drips extinguish |
| d | 80.0 | 0 | 0 | 0 | 0 | 15.00 | 5.00 | SE | — | No |
| e | 71.3 | 23.7 | 0 | 0 | 0 | 3.75 | 1.25 | RTFP | 15 | Yes, drips extinguish |
| f | 67.5 | 22.5 | 0 | 0 | 0 | 7.50 | 2.50 | SE | — | Yes, drips extinguish |
| g | 63.8 | 21.2 | 0 | 0 | 0 | 11.25 | 3.75 | SE | — | No |
| h | 71.3 | 0 | 23.7 | 0 | 0 | 3.75 | 1.25 | SE | — | No |
| i | 67.5 | 0 | 22.5 | 0 | 0 | 7.50 | 2.50 | SE | — | No |
| j | 63.8 | 0 | 21.2 | 0 | 0 | 11.25 | 3.75 | SE | — | No |
| k | 71.3 | 0 | 0 | 23.7 | 0 | 3.75 | 1.25 | RTFP | 25 | Yes |
| l | 67.5 | 0 | 0 | 22.5 | 0 | 7.50 | 2.50 | SE | — | No |
| m | 63.8 | 0 | 0 | 21.2 | 0 | 11.25 | 3.75 | SE | — | No |
| n | 71.3 | 0 | 0 | 0 | 23.7 | 3.75 | 1.25 | RTFP | 27 | B |
| o | 67.5 | 0 | 0 | 0 | 22.5 | 7.50 | 2.5 | SE | — | No |
| p | 63.8 | 0 | 0 | 0 | 21.2 | 11.25 | 3.75 | SE | — | No |

TABLE 6

| Composition | Styrene/Acrylonitrile | Chrysotile | Anthophyllite | Amosite | DCB[2] | DE-CHLORANE[3] | $Sb_2O_3$ | Rating[4] | Burns[5] | Drips[6] |
|---|---|---|---|---|---|---|---|---|---|---|
| A | 75 | 20 | 0 | 0 | 3.75 | 0 | 1.25 | RTFP | 16–30 | No |
| B | 70 | 20 | 0 | 0 | 7.50 | 0 | 2.50 | SE | — | No |
| C | 65 | 20 | 0 | 0 | 11.25 | 0 | 3.75 | SE | — | No |
| D | 70 | 20 | 0 | 0 | 10.0 | 0 | 0 | SE | — | No |
| E | 70 | 20 | 0 | 0 | 0 | 10.0 | 0 | RTFP | 32 | B |
| F | 70 | 0 | 0 | 20 | 10 | 0 | 0 | RTFP | 29 | No |
| G | 70 | 0 | 20 | 0 | 10 | 0 | 0 | RTFP | 25 | B |

Compositions F and G compare unfavourably with D, showing that chrysotile asbestos is superior to anthophyllite and amosite in terms of the flame retardance imparted to the compositions.

TABLE 7

| Composition | Nylon 6 % | Glass[1] Fibre | Chrysotile | DCB[2] | $Sb_2O_3$ | Rating[4] | Burns[5] | Drips[6] |
|---|---|---|---|---|---|---|---|---|
| a | 95 | 0 | 0 | 3.75 | 1.25 | RTFP | 15 | Yes* |
| b | 90 | 0 | 0 | 7.50 | 2.50 | SE | — | Yes* |
| c | 85 | 0 | 0 | 11.25 | 3.75 | SE | — | No |
| d | 80 | 0 | 0 | 15.00 | 5.00 | SE | — | No |
| e | 71.3 | 23.7 | 0 | 3.75 | 1.25 | RTFP | 20 | Yes* |
| f | 67.5 | 22.5 | 0 | 7.50 | 2.50 | RTFP | 10 | Yes* |
| g | 63.8 | 21.2 | 0 | 11.25 | 3.75 | SE | — | No |
| h | 71.3 | 0 | 23.7 | 3.75 | 1.25 | RTFP | 0 | No |
| i | 67.5 | 0 | 22.5 | 7.50 | 2.50 | SE | — | No |
| j | 63.8 | 0 | 21.2 | 11.25 | 3.75 | SE | — | No |

Tables 1 and 2 illustrate the flame extinguishing effect of chrysotile asbestos fibre reinforcement and also the prevention of dripping of burning fragments. It also shows that reinforcement with glass fibre or other forms of asbestos has little flame suppressing effect.

EXAMPLE 2

The experiments described in Example 1 were repeated, but in this case high density polyethylene was used in place of polypropylene of Example 1. Table 3 shows the compositions tested and the results obtained.

EXAMPLE 3

The experiments described in Example 1 were repeated, but in this case polystyrene was used in place of polypropylene. Table 4 shows the compositions tested and the results obtained.

EXAMPLE 4

The experiments described in Example 1 were repeated, but in this case styrene-acrylonitrile copolymer was used in place of polypropylene. Tables 5 and 6 show the compositions tested and the results obtained.

EXAMPLE 5

The experiments described in Example 1 were repeated, but in this case nylon 6 was used in place of polypropylene. Table 7 shows the compositions tested and the results obtained.

EXAMPLE 6

In this case a series of experiments were carried out by varying the content of chrysotile asbestos and that of the fire retardant additive mixture with each polymer. It was possible from the results obtained to tabulate the additive content necessary with each polymer and chrysolite asbestos content, to give self extinguishing properties. The results are shown in Tables 8 and 9.

TABLE 8

| Polymer | Asbestos content (%) | Amount of decabromo diphenyl/antimony trioxide mixture to give self extinguishing properties (%) |
|---|---|---|
| Polypropylene | 0 | 20.0 |
| | 10 | 18.0 |
| | 25 | 10.0 |
| | 40 | 7.5 |
| Polyethylene | 0 | 18.0 |
| | 10 | 15.0 |
| | 25 | 5.0 |
| | 40 | 2.5 |
| Polystyrene | 0 | 25.0 |
| | 10 | 15.0 |
| | 25 | 10.0 |
| | 40 | 5.0 |
| Styrene/ acrylonitrile copolymer | 0 | 15.0 |
| | 10 | 10.0 |
| | 25 | 5.0 |
| | 40 | 2.5 |
| Nylon 6 polymer | 0 | 10.0 |
| | 10 | 20.0 |
| | 25 | 15.0 |
| | 40 | 10.0 |

The Tables above show that chrysotile asbestos fibre is effective as a flame retardant additive, its value as a reinforcing fibre for thermoplastic polymers is illustrated in Table 9.

TABLE 9

| Polymer | Chrysotile asbestos fibre content (%) | Tensile strength (MN/m$^2$) | Flexural strength (MN/m$^2$) | Flexural modulus (GN/m$^2$) | Deflection temperature (°C) |
|---|---|---|---|---|---|
| Polypropylene | 0 | 34 | 48 | 1.4 | 100 |
| | 25 | 46 | 75 | 4.0 | 140 |
| High density polyethylene | 0 | 30 | 41 | 1.2 | 82 |
| | 25 | 45 | 75 | 4.5 | 118 |
| Polystyrene | 0 | 48 | 62 | 3.1 | 90 |
| | 25 | 58 | 108 | 7.5 | 92 |
| Styrene/ acrylonitrile copolymer | 0 | 69 | 105 | 3.4 | 96 |
| | 25 | 77 | 125 | 9.5 | 105 |
| Nylon 6 | 0 | 76 | No break | 1.4 | 185 |
| | 25 | 91 | 202 | 8.5 | 202 |

A further series of tests was effected, omitting the fire-retardant additives, with the compositions and results shown in Table 10.

TABLE 10

| Polymer | Chrysotile % | Rating[4] | Burns[5] | Drips[6] |
|---|---|---|---|---|
| Polypropylene | 0 | RTFP | 38 | Yes |
| | 5 | " | 41 | Yes |
| | 10 | " | 36 | B |
| | 25 | " | 28 | No |
| | 40 | " | 18 | No |
| Polystyrene | 0 | " | 43 | S.B. |
| | 5 | " | 46 | S.B. |
| | 10 | " | 46 | S.B. |
| | 25 | " | 31 | S.B. |
| | 40 | " | 20 | No |
| Nylon 6 | 0 | " | 15 | Yes |
| | 5 | " | 20 | Yes |
| | 10 | " | 23 | Yes |
| | 25 | " | 10 | Yes |
| | 40 | " | negligible | No |

Analysis of the above Tables shows, inter alia the following points.

1. When chrysolite asbestos is used as a reinforcing agent in thermoplastics, the fire retardant properties are improved in at least the rating or "drips" tests, frequently in both, compared to the results for the tests where the reinforcing agent is an equivalent amount of glass fibre or of anthophyllite or amosite asbestos.

2. When using chrysotile asbestos as reinforcement, the amount of fire retardant agent necessary to achieve retardant properties equivalent to those of a glass or anthophyllite or amosite reinforced material of equivalent fibre content, is at least half and frequently much less than that necessary in the glass, anthophyllite or amosite reinforced material.

To understand the above conclusions, it is, of course, necessary to compare similar compositions, e.g. compositions (h), (i) and (j) should be compared with compositions (e), (f) and (g) respectively in each of Tables 1, 3, 4, 5 and 7; compositions H, I, J and Q, R, S, should be compared with the other respectively similar compositions of Table 2; and composition D should be compared with F and G in Table 6. Further, it is seen by comparison of (h) with (k) and (h) in Table 5 that less fire retardant additive is required with chrysotile asbestos than with other forms of asbestos, to achieve equivalent degrees of flame resistance. It is clear that anthophyllite and amosite asbestos act as "inert" fillers similar to glass fibre, in respect of flame retardance, and do not exhibit the fire retardant property shown by equivalent amounts of chrysotile asbestos in otherwise identical compositions.

It should be noted that the nature of the polymer dictates the chrysotile asbestos fibre content therein, e.g. it is possible to disperse up to 45 percent or more by weight of chrysotile asbestos in polypropylene, but the maximum workable content of chrysotile in the stiffer flowing polymers is about 30 percent although higher percentages can be achieved; it is preferred to use not less than 25 percent by weight chrysotile asbestos in polypropylene and nylon 6.

I claim:

1. A fire resistant thermoplastic composition comprising
   a. from 40 to 90 percent by weight of a thermoplastic polymer selected from the group consisting of polypropylene, copolymers of propylene, polyethylene, polystyrene, styrene/acrylonitrile copolymers, polyamides and mixtures thereof; and
   b. a fire-retardant additive consisting essentially of
      i. from 5 to 40 percent by weight of chrysotile asbestos fibres; and
      ii. from 2.5 to 20 percent by weight of an additive mixture of antimony trioxide and at least one halogenated hydrocarbon selected from the group consisting of decabromodiphenyl and the double Diels-Alder condensation product of hexachlorocyclopentadiene and cyclooctadiene.

2. The fire-resistant composition of claim 1 containing from 20 to 40 percent by weight of the chrysotile asbestos fibres and from 5 to 10 percent by weight of said additive mixture.

3. The fire-resistant composition of claim 1 wherein the additive mixture consists of at least 2.5 percent by weight, based on the total weight of the composition, of a mixture of 3 parts by weight of a halogenated hydrocarbon and one part by weight of antimony trioxide.

* * * * *